United States Patent
Zhang

(10) Patent No.: US 10,667,218 B2
(45) Date of Patent: May 26, 2020

(54) METHOD FOR CONTROLLING UNLOCKING AND RELATED PRODUCTS

(71) Applicant: Guangdong Oppo Mobile Telecommunications Corp., Ltd., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/577,752

(22) Filed: Sep. 20, 2019

(65) Prior Publication Data
US 2020/0022084 A1    Jan. 16, 2020

Related U.S. Application Data

(63) Continuation of application No. PCT/CN2017/082450, filed on Apr. 28, 2017.

(51) Int. Cl.
*H04M 1/66* (2006.01)
*H04W 52/02* (2009.01)
(Continued)

(52) U.S. Cl.
CPC ........ *H04W 52/0254* (2013.01); *G06F 21/32* (2013.01); *G06K 9/00013* (2013.01); *G06K 9/00087* (2013.01); *H04M 1/673* (2013.01)

(58) Field of Classification Search
USPC .................... 455/411; 345/173; 1/1
See application file for complete search history.

(56) References Cited

U.S. PATENT DOCUMENTS

2010/0225607 A1\* 9/2010 Kim .................. G06F 3/042 345/173
2011/0025626 A1\* 2/2011 Inami ................ G06F 3/04883 345/173
(Continued)

FOREIGN PATENT DOCUMENTS

CN    205121504 U    3/2016
CN    105528099 A    4/2016
(Continued)

OTHER PUBLICATIONS

International search report issued in corresponding international application No. PCT/CN2017/082450 dated Jan. 24, 2018.
(Continued)

*Primary Examiner* — David Q Nguyen
(74) *Attorney, Agent, or Firm* — Young Basile Hanlon & MacFarlane, P.C.

(57) ABSTRACT

A method for controlling unlocking and related products are provided. The method includes the following. A touch display screen of a terminal instructs a fingerprint recognition device of the terminal to collect fingerprint data upon detecting a first touch operation in a first area. The fingerprint recognition device collects the fingerprint data and sends the fingerprint data to a fingerprint recognition device microcontroller unit MCU of the terminal. The fingerprint recognition device microcontroller unit MCU compares the fingerprint data with preset fingerprint template data in the terminal and instructs an application processor AP of the terminal to light up the touch display screen when the fingerprint data is matched with the fingerprint template data. The AP lights up the touch display screen and unlocks the touch display screen.

17 Claims, 8 Drawing Sheets

(51) Int. Cl.
 G06F 21/32 (2013.01)
 G06K 9/00 (2006.01)
 H04M 1/673 (2006.01)

(56) References Cited

U.S. PATENT DOCUMENTS

| | | | |
|---|---|---|---|
| 2012/0071149 A1 | 3/2012 | Bandyopadhyay et al. | |
| 2016/0092018 A1 | 3/2016 | Lee et al. | |
| 2017/0124381 A1* | 5/2017 | Liu | G06K 9/0002 |
| 2017/0300700 A1* | 10/2017 | Li | G06F 3/04883 |
| 2017/0316248 A1* | 11/2017 | He | G06K 9/00006 |
| 2017/0357317 A1* | 12/2017 | Chaudhri | H04M 1/72552 |
| 2017/0357439 A1* | 12/2017 | Lemay | G06F 3/04883 |
| 2018/0260602 A1* | 9/2018 | He | G06K 9/0008 |

FOREIGN PATENT DOCUMENTS

| | | |
|---|---|---|
| CN | 105549868 A | 5/2016 |
| CN | 105809003 A | 7/2016 |
| CN | 205405465 U | 7/2016 |
| CN | 106022073 A | 10/2016 |
| CN | 106126998 A | 11/2016 |
| CN | 106250884 A | 12/2016 |
| EP | 3032385 A1 | 6/2016 |

OTHER PUBLICATIONS

Extended European search report issued in corresponding European application No. 17907167.5 dated Dec. 10, 2019.

\* cited by examiner

METHOD FOR CONTROLLING UNLOCKING AND RELATED PRODUCTS

CROSS-REFERENCE TO RELATED APPLICATION (S)

This application is a continuation of International Application No. PCT/CN2017/082450, filed on Apr. 28, 2017, the disclosure of which is hereby incorporated by reference in its entirety.

TECHNICAL FIELD

This disclosure relates to the technical field of terminals, and particularly to a method for controlling unlocking and related products.

BACKGROUND

With wide popularity of smart phones, the smart phone can support an increasing number of applications and are becoming more powerful. The smart phone is also becoming diversified and personalized and has already been an indispensable electronic device in users' life. More and more research shows that how software works and how the users use smartphones are key factors in determining energy consumption and efficiency of a system.

At present, most smart phones adopt fingerprint unlocking schemes. The fingerprint recognition device of the mobile phone is generally installed in a separate area, such as a Home button on a lower side of a screen of the mobile phone, the back of the mobile phone, or the like. When the user unlocks a mobile phone in a screen-off state, a fingerprint of a finger of the user needs to be touched or pressed on an area of the fingerprint recognition device, so that the fingerprint recognition device can collect fingerprint data. After the fingerprint data is matched, the screen is lighted up and the mobile phone is unlocked.

SUMMARY

According to a first aspect, a terminal is provided in implementations of the disclosure. The terminal includes an application processor (AP), a touch display screen, a fingerprint recognition device, and a fingerprint recognition device MCU. The terminal has a fingerprint recognition area in a first area of the touch display screen.

The touch display screen is configured to instruct the fingerprint recognition device to collect fingerprint data of a user upon detecting a first touch operation of the user in the first area. The fingerprint recognition device is configured to collect the fingerprint data and send the fingerprint data to the fingerprint recognition device MCU. The fingerprint recognition device MCU is configured to compare the fingerprint data with preset fingerprint template data in the terminal, and to instruct the AP to light up the touch display screen when the fingerprint data is matched with the fingerprint template data. The AP is configured to light up the touch display screen and unlock the touch display screen.

According to a second aspect, a method for controlling unlocking is provided in implementations of the disclosure. The method is applicable to a terminal. The terminal includes an AP, a touch display screen, a fingerprint recognition device, and a fingerprint recognition device MCU. The terminal has a fingerprint recognition area in a first area of the touch display screen. The method includes the following.

The mobile terminal controls the touch display screen to instruct the fingerprint recognition device to collect fingerprint data of a user upon detecting a first touch operation of the user in the first area. The mobile terminal controls the fingerprint recognition device to collect the fingerprint data and to send the fingerprint data to the fingerprint recognition device MCU. The mobile terminal compares, with the fingerprint recognition device MCU, the fingerprint data with preset fingerprint template data in the mobile terminal, and instructs, with the fingerprint recognition device MCU, the AP to light up the touch display screen when the fingerprint data is matched with the fingerprint template data. The mobile terminal lights up, with the AP, the touch display screen and unlocks, with the AP, the touch display screen.

According to a third aspect, a non-transitory computer readable storage medium is provided. The non-transitory computer readable storage medium is configured to store a computer program which, when executed by a processor including an AP of a terminal, cause the processor to: instruct a fingerprint recognition device of the terminal to collect fingerprint data of a user upon detecting a first touch operation of the user in a first area of a touch display screen of the terminal, collect the fingerprint data and send the fingerprint data to a fingerprint recognition device MCU of the terminal, compare the fingerprint data with preset fingerprint template data in the terminal and instruct the AP to light up the touch display screen, with the fingerprint recognition device MCU, when the fingerprint data is matched with the fingerprint template data, and light up the touch display screen and unlock a lock-screen interface, with the AP.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order for those skilled in the art to better understand technical solutions of the present disclosure, in the following, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skilled in the art based on implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A terminal in implementations of the disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as the terminal. Hereinafter, implementations of the disclosure will be described in detail.

Figure 1A:
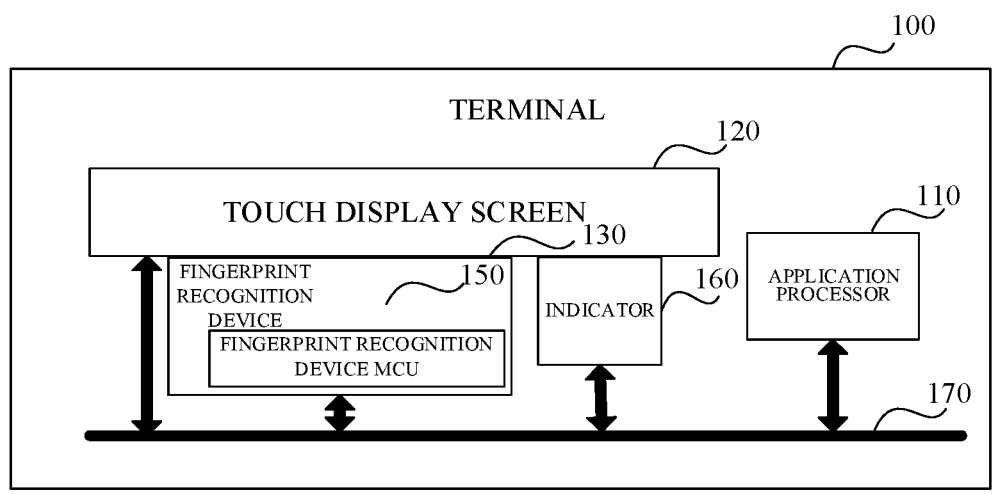
FIG. 1A is a schematic structural diagram illustrating a terminal according to an implementation of the present disclosure.

FIG. 1A is a schematic structural diagram illustrating a terminal 100 according to an implementation of the present disclosure. The terminal 100 includes an application processor (AP) 110, a touch display screen 120, a fingerprint recognition device 130, a fingerprint recognition device microcontroller unit (MCU) 150, and an indicator 160. The fingerprint recognition device 130 is coupled to the touch display screen 120. The fingerprint recognition device MCU 150 is coupled to the fingerprint recognition device 130. The indicator 160 is coupled to the touch display screen 120. The terminal has a fingerprint recognition area in a first area of the touch display screen 120. The indicator 160 corresponds to the first area of the touch display screen 120 in location. The AP 110 is coupled with the touch display screen 120, the fingerprint recognition device 130, and the indicator 160 via a bus 170.

The touch display screen 120 is configured to instruct the fingerprint recognition device 130 to collect fingerprint data of a user upon detecting a first touch operation of the user in the first area.

The touch display screen 120 includes a touch screen and a display screen. The touch screen includes a touch screen MCU and the touch screen MCU is always in a waked up state and can be configured to detect a touch operation(s) of the user.

Figure 1B:
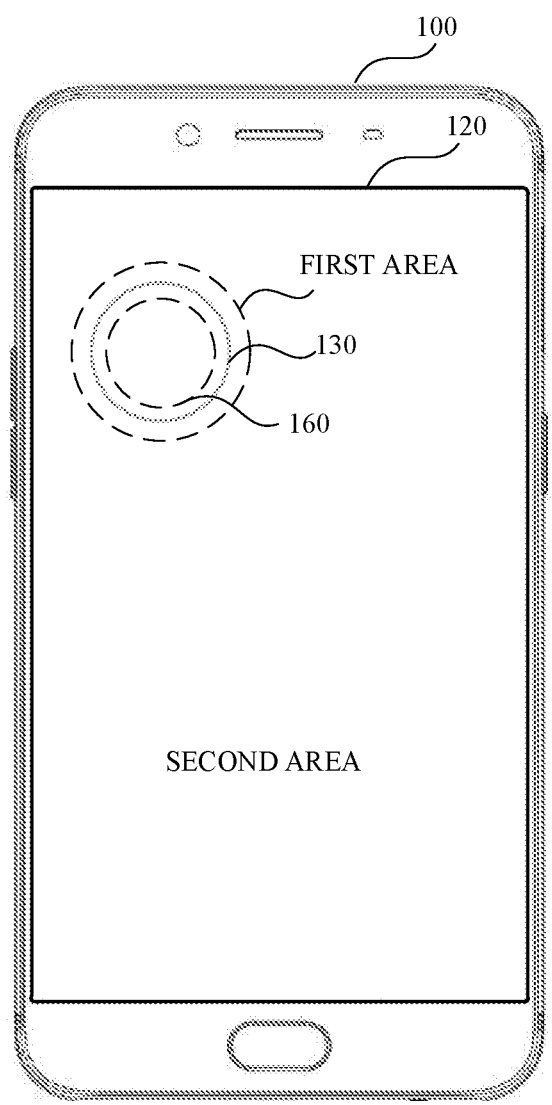
FIG. 1B is a schematic structural diagram illustrating a first area in a touch display screen according to an implementation of the present disclosure.

In an example, the first area is any preset area of the touch display screen 120 and locates on an upper left side (as illustrated in FIG. 1B), an upper side, an lower side, an left side, or an right side of the touch screen display 120, which is not limited herein.

The fingerprint recognition device 130 is configured to collect the fingerprint data and send the fingerprint data to the fingerprint recognition device MCU 150.

The fingerprint recognition device MCU 150 is configured to compare the fingerprint data with preset fingerprint template data in the terminal, and to instruct the AP 110 to light up or turn on the touch display screen when the fingerprint data is matched with the fingerprint template data.

The AP 110 is configured to light up the touch display screen 120 and to unlock the touch display screen. In this case, a lock-screen interface of the terminal is unlocked.

According to this implementation, when the first touch operation in the first area is detected, the touch display screen of the terminal instructs the fingerprint recognition device to collect the fingerprint data. The fingerprint recognition device collects the fingerprint data and sends the fingerprint data to the fingerprint recognition device MCU. The fingerprint recognition device MCU compares the fingerprint data with the preset fingerprint template data in the terminal, and instructs the AP to light up the touch display screen when the fingerprint data is matched with the fingerprint template data. The AP lights up the touch display screen (that is, the whole touch display screen) and unlocks the lock-screen interface. As such, the terminal can accurately identify the first touch operation of the user in the first area in which the fingerprint recognition device locates, and then instruct the fingerprint recognition device to collect the fingerprint data. In this way, it is possible to prevent a touch operation of the user on an area other than the first area from accidentally triggering the fingerprint recognition device to collect the fingerprint data. In addition, the fingerprint recognition device MCU can cooperate with the AP to perform recognition of the fingerprint data during controlling unlocking, compared with the case that the AP processes all operations, long time consumption and low efficiency can be avoided, thereby improving the efficiency of controlling unlocking of the terminal, which can further improve the accuracy and intelligence of the fingerprint unlocking of the terminal.

In an implementation, the touch display screen 120 is further configured to wake up all the AP 110, the fingerprint recognition device 130, and the fingerprint recognition device MCU 150 and to instruct the fingerprint recognition device MCU 150 to light up the indicator 160, upon detecting a second touch operation of the user in a second area. The indicator corresponds to the first area in location. The second area is an area of the touch display screen 120 other than the first area. The terminal is in a screen-off state and a touch screen of the touch display screen 120 is in a waked state.

The fingerprint recognition device MCU 150 is configured to light up the indicator 160 corresponding to the first area of the touch display screen 120 in location. The indicator 160 lighted up is configured to guide a fingerprint enrollment operation of the user.

The fingerprint enrollment operation is the first touch operation in the first area.

The first area is smaller than the second area.

In an example, the indicator can be provided under the first area of the touch display screen. The indicator can be a light-emitting diode (LED).

According to this implementation, when the second touch operation of the user in the second area is detected, the touch display screen of the terminal first wakes up all the AP, the fingerprint recognition device, and the fingerprint recognition device MCU and instructs the fingerprint recognition device MCU to light up the indicator. The indicator corresponds to the first area in location. The fingerprint recognition device MCU then lights up the indicator, where the indicator is configured to timely remind the user of a location of the fingerprint recognition device for enrollment of fingerprint data, and the second area is the area of the touch display screen other than the first area. As such, the terminal provides a trigger mechanism for an initialization process of fingerprint unlocking, where the initialization process of fingerprint unlocking refers to waking up the AP, the fingerprint recognition device, and the fingerprint recognition device MCU, and reminding the user of the location of the fingerprint recognition device by lighting up the indicator corresponding to the first area in location. With such trigger mechanism, when the terminal is in the screen-off state, there is no need to consume power to continuously wake up the AP, the fingerprint recognition device, and the fingerprint recognition device MCU. Since the first area is smaller than the second area, the second area can be conveniently touched by the user, thereby triggering the initialization process of fingerprint unlocking of the terminal in the screen-off state. In this way, it is possible to improve the convenience of triggering the initialization process of fingerprint unlocking of the terminal and the efficiency of power management.

In addition, since the AP, the fingerprint recognition device, and the fingerprint recognition device MCU are waked up synchronously, compared with waking up the AP, the fingerprint recognition device, and the fingerprint recognition device MCU sequentially, time can be saved, which is advantageous for further improving the speed of fingerprint unlocking of the terminal. Furthermore, when the fingerprint or the fingerprint data is matched, the indicator corresponding to the first area of the touch display screen in location is lighted up rather than the first area of the touch display screen. It is possible to avoid excessive consumption of the luminescent material of the first area of the touch display, improve balance of the touch display, and prolong service life of the touch display, which can further improve the accuracy and intelligence of the fingerprint unlocking of the terminal.

In an example, the touch display screen 120 includes a touch screen and a display screen. The touch screen is stacked on the display screen, that is, the display screen is disposed at a lower side of the touch screen. The fingerprint recognition device 130 includes a fingerprint sensor, where the fingerprint sensor includes at least one of: an optical fingerprint sensor, a capacitive fingerprint sensor, an ultrasonic fingerprint sensor, and the like.

In the case that the fingerprint sensor is a capacitive fingerprint sensor and the touch screen of the touch display screen is a capacitive touch screen, the fingerprint recognition device is coupled to the touch display screen as follows. The fingerprint recognition device is integrated into the touch screen of the touch display screen; specifically, a first sensing capacitor array of the fingerprint recognition device may be embedded in a second sensing capacitor array of the touch screen, and sensing capacitors of the first sensing capacitor array are evenly distributed in the first region.

In the case that the fingerprint sensor is an optical fingerprint sensor, the fingerprint recognition device is coupled to the touch display screen as follows. The fingerprint recognition device is integrated into the touch display screen. The fingerprint recognition device of the terminal collects the fingerprint data of the user based on the principle of pinhole imaging. The touch screen and the display screen of the touch display screen have a spacing layer therebetween and the spacing layer is provided with a first pinhole array layer in a first preset area. The display screen has a driving circuit layer, which is provided with an evenly distributed pinhole array in a second preset area at print stage. The evenly distributed pinhole array on the driving circuit layer serves as a second pinhole array layer. The first pinhole array layer has light transmission holes that are in one-to-one correspondence with light transmission holes of the second pinhole array layer. The optical fingerprint sensor includes a charge-coupled device (CCD) array layer, and the CCD array layer is configured to detect light transmitted through the first pinhole array layer and the second pinhole array layer. The first preset area and the second preset area both correspond to the first area.

In the case that the fingerprint sensor is an ultrasonic fingerprint sensor, the fingerprint recognition device is coupled to the touch display screen as follows. Under the first area of the touch display screen, a vacuum detecting chamber is disposed. In the vacuum detecting chamber, multiple ultrasonic sensors are evenly arranged. The ultrasonic sensor includes an ultrasonic signal transmitter and an ultrasonic signal receiver, where the ultrasonic signal transmitter is configured to transmit a signal of a specific frequency to detect a fingerprint of the user and the ultrasonic signal receiver is configured to receive a reflected echo signal. The ultrasonic wave has an ability of transmitting the material and produces different echoes of different sizes depending on the material (when the ultrasonic wave reaches surfaces of different material, it is absorbed, transmitted, and reflected to different extents). With the above, the ultrasonic sensor can distinguish positions of ridge and valley of a fingerprint of a finger of the user.

The display screen can be a thin film transistor-liquid crystal display (TFT-LCD), a light emitting diode (LED) display, an organic light-emitting diode (OLED) display, or the like.

Figure 2:
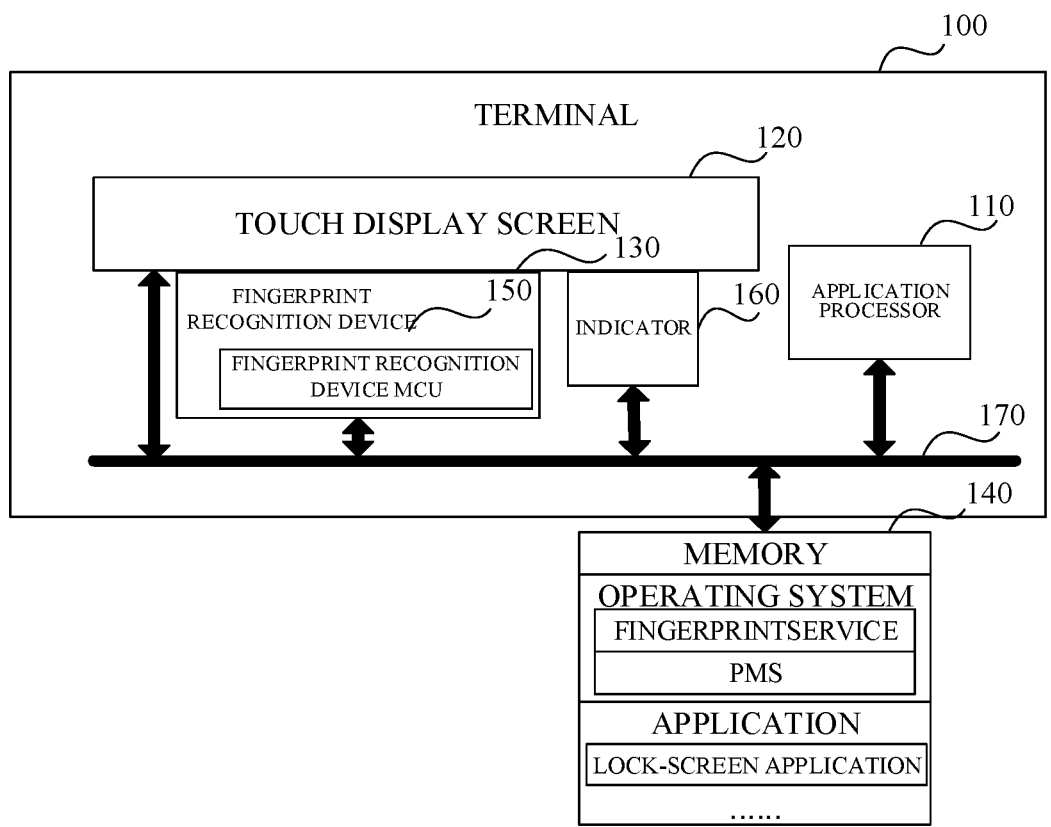
FIG. 2 is a schematic structural diagram illustrating a terminal according to another implementation of the present disclosure.

In an implementation, as illustrated in FIG. 2, the terminal 100 further includes a memory 140. The memory 140 is configured to store a lock-screen application and an operating system (for example, an Android® system). The operating system includes a FingerprintService and a power manager service (PMS). The AP 110 and the fingerprint recognition device MCU 150 is coupled with the memory 140 via the bus 170. The FingerprintService can be a thread for serving fingerprint recognition.

In terms of comparing the fingerprint data with the preset fingerprint template data in the terminal, the fingerprint recognition device MCU is configured to invoke the FingerprintService to compare the fingerprint data with the preset fingerprint template data in the terminal.

In terms of lighting up the touch display screen 120 and unlocking the lock-screen interface, the AP 110 is configured to: invoke the PMS to light up the touch display screen 120 and the lock-screen application to unlock the lock-screen interface when the fingerprint data is matched with the fingerprint template data.

In this implementation, the AP 110 is further configured to wake up the PMS before the AP 110 lights up the indicator 160.

According to this implementation, before lighting up the indicator 160 (that is, before comparing the fingerprint data with the preset fingerprint template data), the AP of the terminal can wake up the PMS. In this way, when the fingerprint data is matched with the preset fingerprint template data, the AP can light up the touch display screen with the PMS in a waked up state already, without waiting the PMS to be waked up, thereby saving time for waiting the PMS to be waked up. It is possible to improve the speed of fingerprint unlocking with the screen lighted up triggered by the user.

In an implementation, the first touch operation in the first area is an operation of touching the first area for a duration greater than a preset duration threshold.

According to this implementation, the first touch operation is the operation of touching the first area for the duration greater than the preset duration threshold. It can be seen that, the first touch operation is not a general touch operation such as a single click. As such, it is possible to prevent, to some extent, an accidental general touch operation of the user in the first area from triggering collection of the fingerprint data, and ensure that the fingerprint data is collected by the fingerprint recognition device only when a fingerprint of a finger of the user is stably contacted with the first area. In this way, the fingerprint recognition device can collect the fingerprint data at appropriate time and the fingerprint data collected can be reliable, which is beneficial to improving the accuracy of fingerprint unlocking.

In an example, the second touch operation in the second area is: a single-touch operation or a click-touch operation in the second area for consecutive N times within a preset duration, where N is an integer greater than 1; a touching-and-sliding operation in the second area for a distance greater than a preset distance threshold; a touching-and-sliding operation in the second area in a graphic matched with a preset graphic; or a pressing operation in the second area in a force greater than a preset strength threshold.

According to this implementation, the second touch operation is the single-touch operation in the second area for consecutive N times within the preset duration, the touching-and-sliding operation in the second area for the distance greater than the preset distance threshold, the touching-and-sliding operation in the second area in the graphic matched with the preset graphic; or the operation of pressing the second area in the force greater than the preset strength threshold. It can be seen that, the second touch operation is not a general touch operation such as a single click. As such, it is possible to avoid, to some extent, unnecessary power consumption of the terminal due to continuously waking up the AP, the fingerprint recognition device, and the fingerprint recognition device MCU by frequent general touch operations of the user on the touch display screen. It is thus beneficial to reducing power consumption and improving power efficiency of the terminal.

Figure 3:
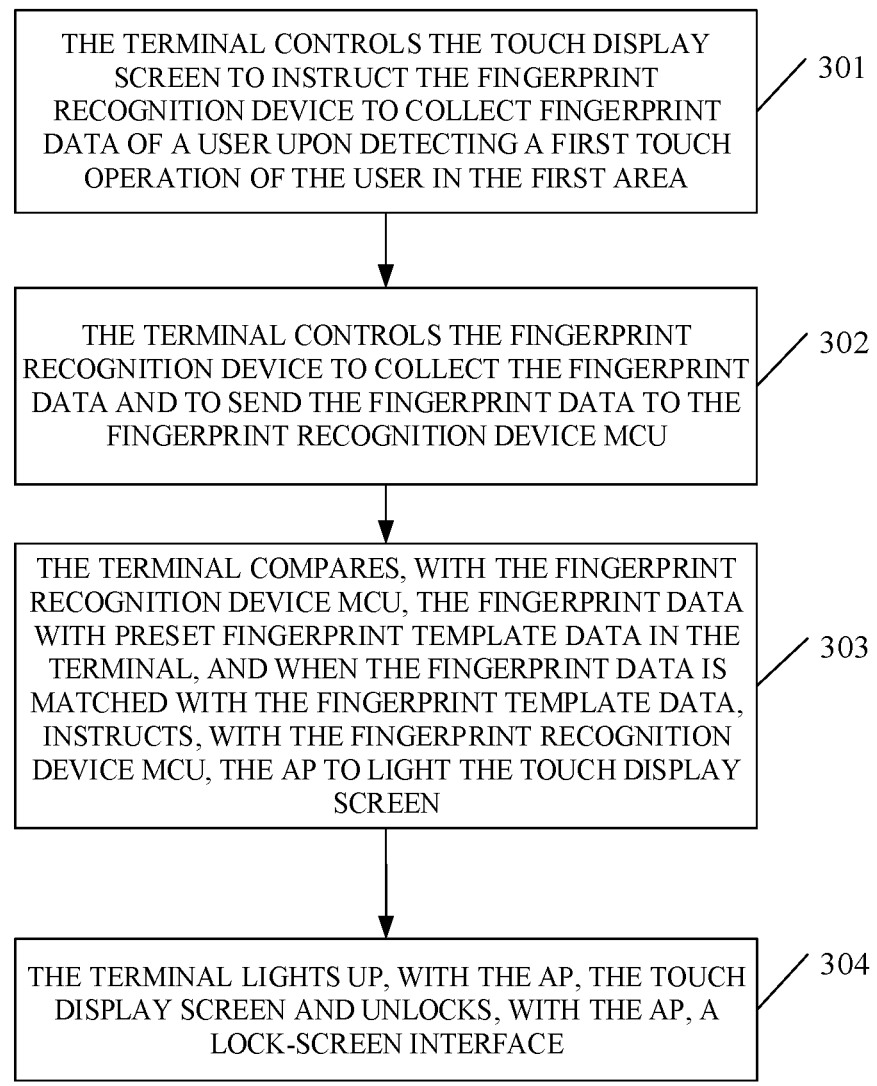
FIG. 3 is a schematic flow chart illustrating a method for controlling unlocking according to an implementation of the present disclosure.

FIG. 3 is a schematic flow chart illustrating a method for controlling unlocking according to an implementation of the present disclosure. The method is applicable to a terminal. The terminal includes an application processor (AP), a touch display screen, a fingerprint recognition device, and a fingerprint recognition device MCU. The fingerprint recognition device is coupled to the touch display screen. The fingerprint recognition device MCU is coupled to the fingerprint recognition device. The terminal has a fingerprint recognition area in a first area of the touch display screen. As illustrated in FIG. 3, the method begins at block 301.

At block 301, the terminal controls the touch display screen to instruct the fingerprint recognition device to collect fingerprint data of a user upon detecting a first touch operation of the user in the first area.

At block 302, the terminal controls the fingerprint recognition device to collect the fingerprint data and to send the fingerprint data to the fingerprint recognition device MCU.

At block 303, the terminal compares, with the fingerprint recognition device MCU, the fingerprint data with preset fingerprint template data in the terminal, and when the fingerprint data is matched with the fingerprint template data, instructs, with the fingerprint recognition device MCU, the AP to light the touch display screen.

At block 304, the terminal lights up, with the AP, the touch display screen and unlocks, with the AP, a lock-screen interface.

According to the implementations of the disclosure, the fingerprint recognition area of the terminal is in the first area of the touch display screen. When the first touch operation of the user in the first area is detected, the touch display screen of the terminal instructs the fingerprint recognition device to collect the fingerprint data. The fingerprint recognition device collects the fingerprint data and sends the fingerprint data to the fingerprint recognition device MCU. The fingerprint recognition device MCU compares the fingerprint data with the preset fingerprint template data, and instructs the AP to light up the touch display screen when the fingerprint data is matched with the fingerprint template data. The AP lights up the touch display screen and unlocks the lock-screen interface. As such, only when the first touch operation in the first area is detected, the touch display screen of the terminal will instruct the fingerprint recognition device to collect the fingerprint data; otherwise, if a touch operation of the user on an area of the touch display screen other than the first area is detected, the touch display screen will not instruct the fingerprint recognition device to collect the fingerprint data. In this way, it is possible to prevent the touch operation on the area other than the first area from accidentally triggering the fingerprint recognition device to collect the fingerprint data. In addition, the fingerprint recognition device MCU can cooperate with the AP to perform recognition of the fingerprint data during controlling unlocking, compared with the case that the AP processes all operations, long time consumption and low efficiency can be avoided, thereby improving the efficiency of controlling unlocking of the terminal, which is beneficial to improving the accuracy and intelligence of the fingerprint unlocking of the terminal.

As an implementation, the terminal further includes an indicator, where the indicator corresponds to the first area in location, and the following is further performed.

The terminal controls the touch display screen to wake up all the AP, the fingerprint recognition device, and the fingerprint recognition device MCU and to instruct the fingerprint recognition device MCU to light up the indicator, upon detecting a second touch operation of the user in a second area. The second area is an area of the touch display screen other than the first area.

The terminal lights up, with the fingerprint recognition device MCU, the indicator.

According to this implementation, when the second touch operation of the user in the second area is detected, the touch display screen of the terminal first wakes up the AP, the fingerprint recognition device, and the fingerprint recognition device MCU and instructs the fingerprint recognition device MCU to light up the indicator, where the indicator corresponds to the first area in location. The fingerprint recognition device MCU then lights up the indicator, where the indicator is configured to timely remind the user of a location of the fingerprint recognition device for enrollment of fingerprint data, and the second area is the area of the touch display screen other than the first area. As such, the terminal provides a trigger mechanism for an initialization process of fingerprint unlocking, where the initialization process of fingerprint unlocking refers to waking up the AP, the fingerprint recognition device, and the fingerprint recognition device MCU, and reminding the user of the location of the fingerprint recognition device by lighting up the indicator corresponding to the first area in location. With such trigger mechanism, when the terminal is in the screen-off state, there is no need to consume power to continuously wake up the AP, the fingerprint recognition device, and the fingerprint recognition device MCU. Since the first area is smaller than the second area, the second area can be conveniently touched by the user, thereby triggering the initialization process of fingerprint unlocking of the terminal in the screen-off state. In this way, it is possible to improve the convenience of triggering the initialization process of fingerprint unlocking of the terminal and the efficiency of power management. In addition, since the AP, the fingerprint recognition device, and the fingerprint recognition device MCU are waked up synchronously, compared with waking up the AP, the fingerprint recognition device, and the fingerprint recognition device MCU sequentially, time can be saved, which is advantageous for further improving the speed of fingerprint unlocking of the terminal. Furthermore, when the fingerprint data is matched, the indicator corresponding to the first area of the touch display screen in location is lighted up rather than the first area of the touch display screen. It is possible to avoid excessive consumption of the luminescent material of the first area of the touch display, improve balance of the touch display, and prolong service life of the touch display, which can further improve the accuracy and intelligence of the fingerprint unlocking of the terminal.

In an implementation, the terminal further includes a memory, configured to store a lock-screen application and an operating system. The operating system includes a FingerprintService and a power manager service (PMS).

The terminal compares, with the fingerprint recognition device MCU, the fingerprint data with the preset fingerprint template data in the terminal as follows. The terminal invokes, with the fingerprint recognition device MCU, the FingerprintService to compare the fingerprint data with the preset fingerprint template data in the terminal.

The terminal lights up, with the AP, the touch display screen and unlocks, with the AP, the lock-screen interface as follows. The terminal invokes, with the AP, the PMS to light up the touch display screen and the lock-screen application to unlock the lock-screen interface when the fingerprint data is matched with the fingerprint template data.

According to this implementation, since the FingerprintService has the authority to directly query a fingerprint template database of the operating system, the FingerprintService can compare the fingerprint data with the preset fingerprint template data, without additional authentication. It is possible to improve convenience and efficiency of comparison of the fingerprint data.

As an implementation, before lighting up, with the AP, the indicator, the terminal further wakes up, with the AP, the PMS.

According to this implementation, before lighting up the indicator (that is, before comparing the fingerprint data with the preset fingerprint template data), the terminal can wake up, with the AP, the PMS. In this way, when the fingerprint data is matched with the preset fingerprint template data, the AP can light up the touch display screen with the PMS in a waked up already, without waiting the PMS to be waked up, thereby saving time for waiting the PMS to be waked up. It is possible to improve the speed of fingerprint unlocking with the screen lighted up triggered by the first touch operation of the user in the first area.

In an implementation, the first touch operation in the first area is an operation of touching the first area for a duration greater than a preset duration threshold.

According to this implementation, the first touch operation is the operation of touching the first area for the duration greater than the preset duration threshold. It can be seen that, the first touch operation is not a general touch operation such as a single click. As such, it is possible to prevent, to some extent, an accidental general touch operation of the user in the first area from triggering collection of the fingerprint data, and ensure that the fingerprint data is collected by the fingerprint recognition device only when a fingerprint of a finger of the user is stably contacted with the first area. In this way, the fingerprint recognition device can collect the fingerprint data at appropriate time and the fingerprint data collected can be reliable, which is beneficial to improving the accuracy of fingerprint unlocking.

In an example, the second touch operation in the second area is: a single-touch operation in the second area for consecutive N times within a preset duration, where N is an integer greater than 1; a touching-and-sliding operation in the second area for a distance greater than a preset distance threshold; or a touching-and-sliding operation in the second area in a graphic matched with a preset graphic.

According to this implementation, the second touch operation is the single-touch operation in the second area for consecutive N times within the preset duration, the touching-and-sliding operation in the second area for the distance greater than the preset distance threshold, or the touching-and-sliding operation in the second area in the graphic matched with the preset graphic. It can be seen that, the second touch operation is not a general touch operation such as a single click. As such, it is possible to prevent, to some extent, frequent general touch operations of the user on the touch display screen from continuously waking up the AP, the fingerprint recognition device, and the fingerprint recognition device MCU by the terminal, where the continuously waking up the AP and the fingerprint recognition device may cause unnecessary power consumption. It is thus beneficial to reducing power consumption and improving power efficiency of the terminal.

Figure 4:
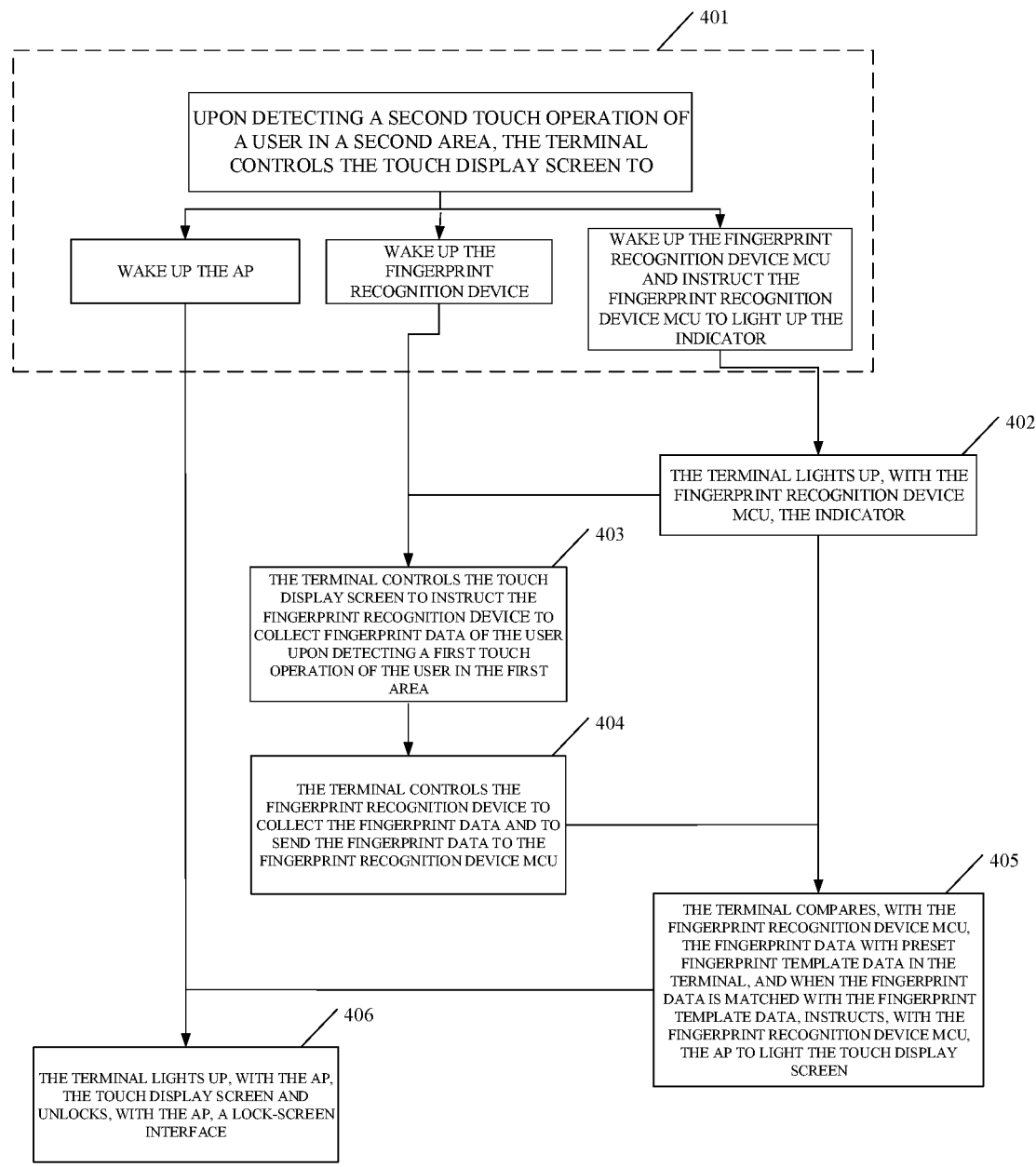
FIG. 4 is a schematic flow chart illustrating a method for controlling unlocking according to another implementation of the present disclosure.

In accordance with FIG. 3, FIG. 4 is a schematic flow chart illustrating a method for controlling unlocking according to another implementation of the present disclosure. The method is applicable to a terminal. The terminal includes an application processor (AP), a touch display screen, a fingerprint recognition device, a fingerprint recognition device MCU, and an indicator. The fingerprint recognition device is coupled to the touch display screen. The fingerprint recognition device MCU is coupled to the fingerprint recognition device. The terminal has a fingerprint recognition area in a first area of the touch display screen. The indicator can light up an area within the first area of the touch display screen and this area can be referred to as a display area. As illustrated in FIG. 4, the method begins at block 401.

At block 401, upon detecting a second touch operation of a user in a second area, the terminal controls the touch display screen to wake up all the AP, the fingerprint recognition device, and the fingerprint recognition device MCU and to instruct the fingerprint recognition device MCU to light up the indicator, where the second area is an area of the touch display screen other than the first area.

At block 402, the terminal lights up, with the fingerprint recognition device MCU, the indicator.

The indicator corresponds to the first area in location and the first area is smaller than the second area.

At block 403, the terminal controls the touch display screen to instruct the fingerprint recognition device to collect fingerprint data of the user upon detecting a first touch operation of the user in the first area.

At block 404, the terminal controls the fingerprint recognition device to collect the fingerprint data and to send the fingerprint data to the fingerprint recognition device MCU.

At block 405, the terminal compares, with the fingerprint recognition device MCU, the fingerprint data with preset fingerprint template data in the terminal, and when the fingerprint data is matched with the fingerprint template data, instructs, with the fingerprint recognition device MCU, the AP to light the touch display screen.

At block 406, the terminal lights up, with the AP, the touch display screen and unlocks, with the AP, a lock-screen interface.

According to the implementations of the disclosure, the fingerprint recognition area of the terminal is in the first area of the touch display screen. When the first touch operation of the user in the first area is detected, the touch display screen of the terminal instructs the fingerprint recognition device to collect the fingerprint data. The fingerprint recognition device collects the fingerprint data and sends the fingerprint data to the fingerprint recognition device MCU. The fingerprint recognition device MCU compares the fingerprint data with the preset fingerprint template data, and instructs the AP to light up the touch display screen when the fingerprint data is matched with the fingerprint template data. The AP lights up the touch display screen and unlocks the lock-screen interface. As such, only when the first touch operation in the first area is detected, the touch display screen of the terminal will instruct the fingerprint recognition device to collect the fingerprint data; otherwise, if a touch operation of the user on an area of the touch display screen other than the first area is detected, the touch display screen will not instruct the fingerprint recognition device to collect the fingerprint data. In this way, it is possible to prevent the touch operation on the area other than the first area from accidentally triggering the fingerprint recognition device to collect the fingerprint data. In addition, the fingerprint recognition device MCU can cooperate with the AP to perform recognition of the fingerprint data during controlling unlocking, compared with the case that the AP processes all operations, long time consumption and low efficiency can be avoided, thereby improving the efficiency of controlling unlocking of the terminal. Furthermore, when the fingerprint or the fingerprint data is matched, the indicator corresponding to the first area of the touch display screen in location is lighted up rather than the first area of the touch display screen. It is possible to avoid excessive consumption of the luminescent material of the first area of the touch display, improve balance of the touch display, and prolong service life of the touch display, which is beneficial to improving the accuracy and intelligence of the fingerprint unlocking of the terminal.

In addition, when the second touch operation of the user in the second area is detected, the touch display screen of the terminal first wakes up all the AP, the fingerprint recognition device, and the fingerprint recognition device MCU. The fingerprint recognition device MCU then, in response to the second touch operation, lights up the indicator after being weaken up, where the indicator is provided at the first area is configured to timely remind the user of a location of the fingerprint recognition device for enrollment of fingerprint data, and the second area is the area of the touch display screen other than the first area. As such, the terminal provides a trigger mechanism for an initialization process of fingerprint unlocking, where the initialization process of fingerprint unlocking refers to waking up the AP, the fingerprint recognition device, and the fingerprint recognition device MCU, and reminding the user of the location of the fingerprint recognition device by lighting up the indicator disposed at the first area. With such trigger mechanism, since the second area is much larger than the first area, the trigger mechanism can be invoked easily. That is, the initialization process of fingerprint unlocking can be conveniently triggered by the user, thereby improving the convenience of the fingerprint unlocking of the terminal. In addition, since the AP, the fingerprint recognition device, and the fingerprint recognition device MCU are waked up synchronously, compared with waking up the AP, the fingerprint recognition device, and the fingerprint recognition device MCU sequentially, time can be saved, which is advantageous for further improving the speed of fingerprint unlocking of the terminal.

Figure 5:
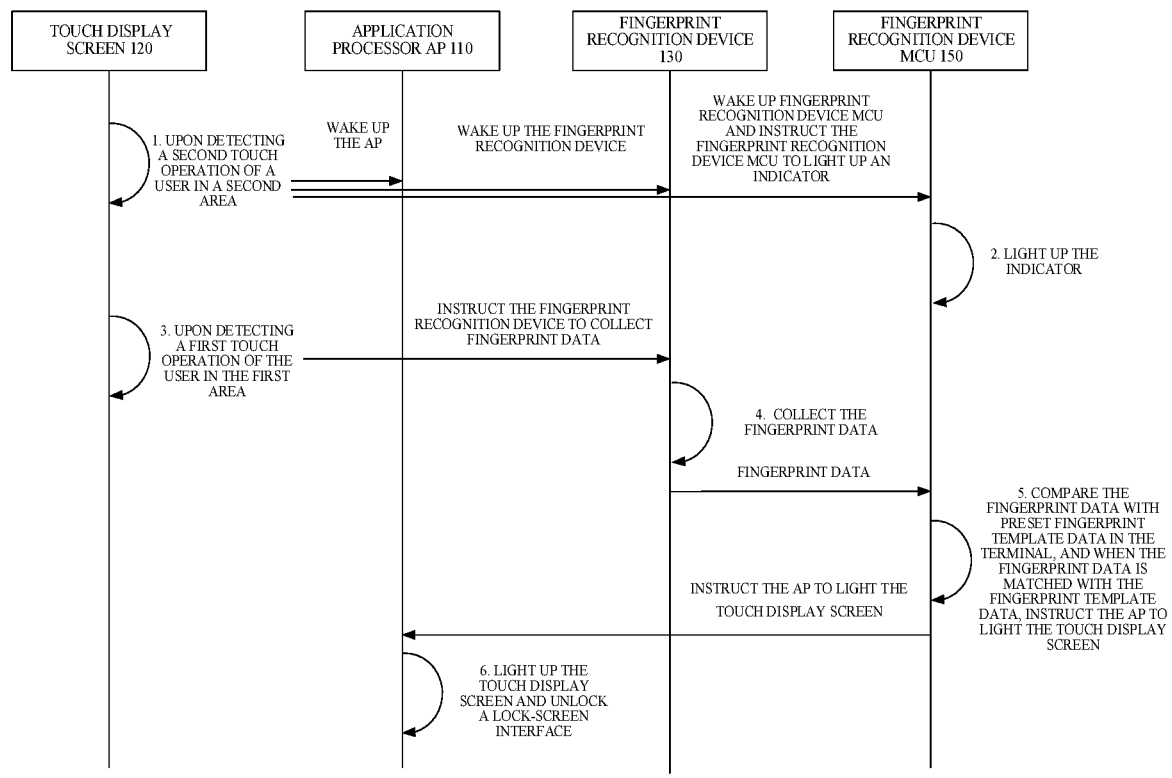
FIG. 5 is a schematic flow chart illustrating a method for controlling unlocking according to another implementation of the present disclosure.

FIG. 5 illustrates procedures in the terminal 100 for describing main procedures involved in the implementations of the disclosure.

1. Upon detecting a second touch operation of a user in a second area, the touch display screen 120 wakes up the AP 110, fingerprint recognition device 130, and the fingerprint recognition device MCU 150 and instructs the fingerprint recognition device MCU 150 to light up an indicator, where the indicator corresponds to the first area in location and the second area is an area of the touch display screen 120 other than the first area.

2. The fingerprint recognition device MCU 150 lights up the indicator.

3. The touch display screen 120 instructs the fingerprint recognition device 130 to collect fingerprint data upon detecting a first touch operation of the user in the first area.

4. The fingerprint recognition device 130 collects the fingerprint data and sends the fingerprint data to the fingerprint recognition device MCU 150.

5. The fingerprint recognition device MCU 150 compares the fingerprint data with preset fingerprint template data in the terminal, and when the fingerprint data is matched with the fingerprint template data, instructs the AP 110 to light the touch display screen 120.

6. The AP 110 lights up the touch display screen 120 and unlocks a lock-screen interface.

Figure 6:
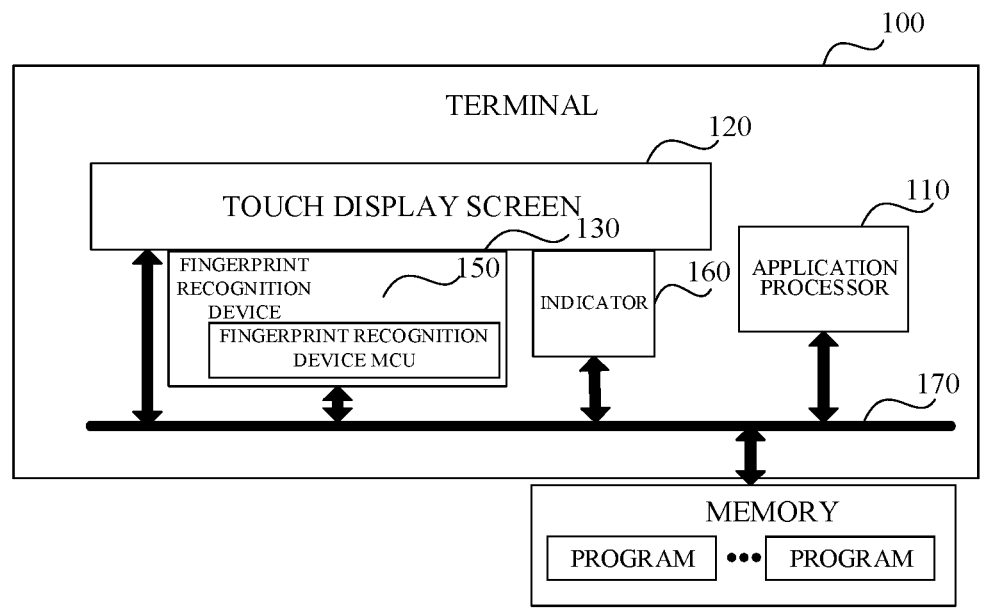
FIG. 6 is a schematic structural diagram illustrating a terminal according to an implementation of the present disclosure.

FIG. 6 is a schematic structural diagram illustrating a terminal according to an implementation of the present disclosure. The terminal includes an application processor (AP), a touch display screen, a fingerprint recognition device, a fingerprint recognition device MCU, and a memory. The memory is configured to store one or more programs. The terminal has a fingerprint recognition area in a first area of the touch display screen.

The one or more programs are configured to be executed by a processor including the AP and the fingerprint recognition device MCU and include instructions configured to execute the following.

The touch display screen is controlled to instruct the fingerprint recognition device to collect fingerprint data of a user upon detecting a first touch operation of the user in the first area.

The fingerprint recognition device is controlled to collect the fingerprint data and to send the fingerprint data to the fingerprint recognition device MCU.

With the fingerprint recognition device MCU, the fingerprint data is compared with preset fingerprint template data in the terminal, and the AP is instructed to light up the touch display screen when the fingerprint data is matched with the fingerprint template data.

With the AP, the touch display screen is lighted up and a lock-screen interface is unlocked.

According to the implementations of the disclosure, the fingerprint recognition area of the terminal is in the first area of the touch display screen. When the first touch operation of the user in the first area is detected, the touch display screen of the terminal instructs the fingerprint recognition device to collect the fingerprint data. The fingerprint recognition device collects the fingerprint data and sends the fingerprint data to the fingerprint recognition device MCU. The fingerprint recognition device MCU compares the fingerprint data with the preset fingerprint template data, and instructs the AP to light up the touch display screen when the fingerprint data is matched with the fingerprint template data. The AP lights up the touch display screen and unlocks the lock-screen interface. As such, only when the first touch operation in the first area is detected, the touch display screen of the terminal will instruct the fingerprint recognition device to collect the fingerprint data; otherwise, otherwise, if a touch operation of the user on an area of the touch display screen other than the first area is detected, the touch display screen will not instruct the fingerprint recognition device to collect the fingerprint data. In this way, it is possible to prevent the touch operation on the area other than the first area from accidentally triggering the fingerprint recognition device to collect the fingerprint data. In addition, the fingerprint recognition device MCU can cooperate with the AP to perform recognition of the fingerprint data during controlling unlocking, compared with the case that the AP processes all operations, long time consumption and low efficiency can be avoided, thereby improving the efficiency of controlling unlocking of the terminal, which is beneficial to improving the accuracy and intelligence of the fingerprint unlocking of the terminal.

In an implementation, the terminal further includes an indicator. The indicator corresponds to the first area in location. The one or more programs further include instructions to execute the following. The touch display screen is controlled to wake up all the AP, the fingerprint recognition device, and the fingerprint recognition device MCU and to instruct the fingerprint recognition device MCU to light up the indicator, when a second touch operation of the user in a second area is detected. The indicator corresponds to the first area in location and the second area is an area of the touch display screen other than the first area. The indicator is lighted up with the fingerprint recognition device MCU.

In an implementation, the terminal further includes a memory. The memory is configured to store a lock-screen application and an operating system. The operating system includes a FingerprintService and a power manager service (PMS). The instructions of the one or more programs configured to compare, with the fingerprint recognition device MCU, the fingerprint data with the preset fingerprint template data in the terminal is configured to: invoke, with the fingerprint recognition device MCU, the FingerprintService to compare the fingerprint data with the preset fingerprint template data in the terminal.

The instructions of the one or more programs configured to light up, with the AP, the touch display screen and unlock, with the AP, the lock-screen interface are configured to: invoke, with the AP, the PMS to light up the touch display screen and the lock-screen application to unlock the lock-screen interface, when the fingerprint data is matched with the fingerprint template data.

In an implementation, before lighting up, with the AP, the indicator, the one or more programs further include instructions to wake up the PMS with the AP.

In an implementation, the first touch operation in the first area is an operation of touching the first area for a duration greater than a preset duration threshold.

Figure 7:
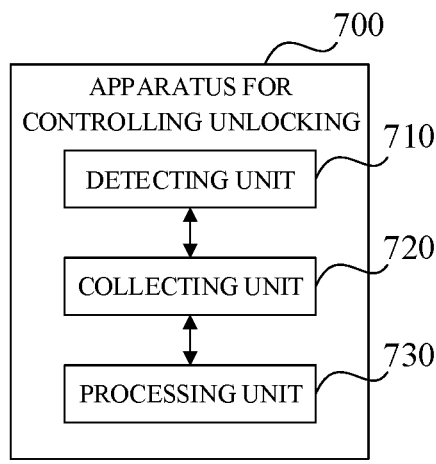
FIG. 7 is a schematic structural diagram illustrating an apparatus for controlling unlocking according to an implementation of the present disclosure.

FIG. 7 is a schematic structural diagram illustrating an apparatus for controlling unlocking according to an implementation of the present disclosure. The apparatus for controlling unlocking is applicable to a terminal. The terminal includes an application processor (AP), a touch display screen, a fingerprint recognition device, a fingerprint recognition device MCU, and an indicator. The fingerprint recognition device is coupled to the touch display screen. The fingerprint recognition device MCU is coupled to the fingerprint recognition device. The terminal has a fingerprint recognition area in a first area of the touch display screen. The indicator can light up an area within the first area of the touch display screen. The apparatus for controlling unlocking 700 include a detecting unit 710, a collecting unit 720, and a processing unit 730.

The detecting unit 710 is configured to: control the touch display screen to instruct the fingerprint recognition device to collect fingerprint data of a user upon detecting a first touch operation of the user in the first area.

The collecting unit 720 is configured to: control the fingerprint recognition device to collect the fingerprint data and to send the fingerprint data to the fingerprint recognition device MCU.

The processing unit 730 is configured to: compare, with the fingerprint recognition device MCU, the fingerprint data with preset fingerprint template data in the terminal, and instruct, with the fingerprint recognition device MCU, the AP to light up the touch display screen when the fingerprint data is matched with the fingerprint template data.

The processing unit 730 is further configured to: light up, with the AP, the touch display screen and unlock, with the AP, a lock-screen interface.

According to the implementations of the disclosure, when the first touch operation in the first area is detected, the detecting unit 710 of the apparatus 700 for controlling unlocking controls the touch display screen to instruct the fingerprint recognition device to collect the fingerprint data. The collecting unit 720 controls the fingerprint recognition device to collect the fingerprint data and send the fingerprint data to the fingerprint recognition device MCU. The processing unit 730 compares, with the fingerprint recognition device MCU, the fingerprint data with the preset fingerprint template data in the terminal, and instructs, with the fingerprint recognition device MCU, the AP to light up the touch display screen when the fingerprint data is matched with the fingerprint template data. The processing unit 730 lights up the touch display screen and unlocks the lock-screen interface, with the AP. As such, only when the first touch operation in the first area is detected, the apparatus for controlling unlocking will instruct the collecting unit 720 to collect the fingerprint data. In this way, it is possible to prevent a touch operation of the user on an area other than the first area from accidentally triggering the collecting unit 720 to collect the fingerprint data. In addition, the fingerprint recognition device MCU can cooperate with the AP to perform recognition of the fingerprint data during controlling unlocking, compared with the case that the AP processes all operations, long time consumption and low efficiency can be avoided, thereby improving the efficiency of controlling unlocking of the terminal, which is beneficial to improving the accuracy and intelligence of the fingerprint unlocking of the terminal.

In an example, the detecting unit 710 is further configured to: control the touch display screen to wake up all the AP, the fingerprint recognition device, and the fingerprint recognition device MCU and to instruct the fingerprint recognition device MCU to light up the indicator, upon detecting a second touch operation of the user in a second area. The indicator corresponds to the first area in location. The second area is an area of the touch display screen other than the first area.

The processing unit 730 is further configured to control the fingerprint recognition device MCU to light up the indicator.

According to this implementation, when the second touch operation of the user in the second area is detected, the apparatus for controlling unlocking first wakes up all the AP, fingerprint recognition device, and the fingerprint recognition device MCU and instructs the fingerprint recognition device MCU to light up the indicator. The indicator corresponds to the first area in location. The fingerprint recognition device MCU is then controlled to light up the indicator, where the indicator is configured to timely remind the user of a location of the fingerprint recognition device for enrollment of fingerprint data, and the second area is the area of the touch display screen other than the first area. As such, the apparatus for controlling unlocking provides a trigger mechanism for an initialization process of fingerprint unlocking, where the initialization process of fingerprint unlocking refers to waking up the AP, the fingerprint recognition device, and the fingerprint recognition device MCU, and reminding the user of the location of the fingerprint recognition device by lighting up the indicator at the first area. With such trigger mechanism, since the second area is much larger than the first area, the trigger mechanism can be invoked easily. That is, the initialization process of fingerprint unlocking can be conveniently triggered by the user, thereby improving the convenience of the fingerprint unlocking of the terminal.

In an example, the terminal further includes a memory, configured to store a lock-screen application and an operating system. The operating system includes a FingerprintService and a power manager service (PMS). The processing unit 730 is configured to: control the fingerprint recognition device MCU to invoke the FingerprintService to compare the fingerprint data with the preset fingerprint template data in the terminal, and control the AP to invoke the PMS to light up the touch display screen and the lock-screen application to unlock the lock-screen interface when the fingerprint data is matched with the fingerprint template data.

In an example, the processing unit 730 is further configured to wake up the PMS via the AP before lighting up the indicator via the AP.

In an example, the first touch operation in the first area is an operation of touching the first area for a duration greater than a preset duration threshold.

In an example, the second touch operation in the second area is an operation of clicking and touching the second area for consecutive N times within a preset duration, where N is an integer greater than 1; an operation of touching the second area and sliding in the second area for a distance greater than a preset distance threshold; or an operation of touching the second area and sliding in the second area in a graphic matched with a preset graphic.

It is to be understood that, in this implementation, functions of the modules of the apparatus 700 for controlling unlocking may be implemented according to the methods in the foregoing method implementations. For the specific implementation process, reference may be made to the related description of the foregoing method implementations, and details are not described herein again.

Figure 8:
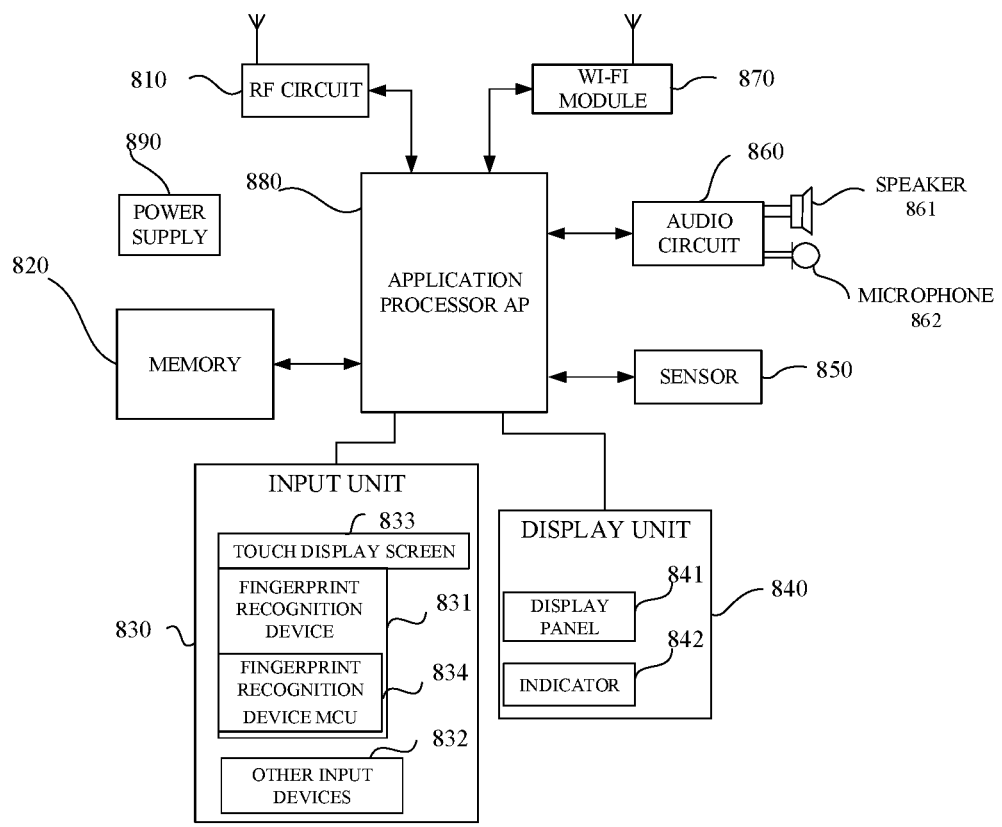
FIG. 8 is a schematic structural diagram illustrating a terminal according to another implementation of the present disclosure.

Implementations of the present disclosure further provide another terminal. As illustrated in FIG. 8, only parts related to the implementations of the present disclosure are illustrated for ease of description. For technical details not described, reference may be made to the method implementations of the present disclosure. The terminal may be any terminal device, such as a mobile phone, a tablet computer, a personal digital assistant (PDA), a point of sale terminal (POS), an on-board computer and the like. The following describes the mobile phone as an example of the terminal.

FIG. 8 is a structural diagram illustrating parts of a mobile phone related to the terminal according to another implementation of the present disclosure. As illustrated in FIG. 8, the mobile phone includes a radio frequency (RF) circuit 810, a memory 820, an input unit 830, a display unit 840, a sensor 850, an audio circuit 860, a wireless fidelity (Wi-Fi) module 870, an application processor (AP) 880, a power supply 890, and other components. Those skilled in the art can understand that the structure of the mobile phone illustrated in FIG. 8 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 8.

The input unit 830 may be configured to receive input digital or character information and generate key signal input associated with user setting and function control of the mobile phone. The input unit 830 may include a touch display screen 833, a fingerprint recognition device 831, a fingerprint recognition device MCU 834, and other input devices 832. The fingerprint recognition device 831 is coupled to the touch display screen 833. The fingerprint recognition device MCU 834 is combined to fingerprint recognition device 831. The mobile phone has a fingerprint recognition area in a first area of the touch display screen 833. In addition to the touch display screen 833, the fingerprint recognition device 831, and the fingerprint recognition device MCU 834, the input unit 830 may further include other input devices 832. The other input devices 832 may include, but are not limit to, one or more of a physical key, a function key (such as a volume control key, a switch key, etc.), a trackball, a mouse, a joystick, and the like.

The touch display screen 833 is configured to instruct the fingerprint recognition device 831 to collect fingerprint data upon detecting a first touch operation of a user in the first area. The fingerprint recognition device 831 is configured to collect the fingerprint data and send the fingerprint data to the fingerprint recognition device MCU 834. The fingerprint recognition device MCU 834 is configured to: compare the fingerprint data with preset fingerprint template data in the terminal, and instruct the AP 880 to light up the touch display screen 833 when the fingerprint data is matched with the fingerprint template data. The AP 880 is configured to light up the touch display screen 833 and unlock a lock-screen interface.

The display unit 840 is configured to display information input by the user or information provided for the user or various menus of the mobile phone. The display unit 840 may include a display panel 841 and an indicator 842. The indicator 842 can light up an area within the first area of the touch display screen 833. The display panel 841 may be in the form of a liquid crystal display (LCD), an organic light-emitting diode (OLED), and so on. Furthermore, the touch display screen 833 can cover the display panel 841 and the indicator 842. When the touch display screen 833 detects a touch operation on or near it, the touch operation is transmitted to the AP 880 to determine a type of touch event, and then the AP 880 provides a corresponding visual output on the display panel 841 depending on the type of touch event. Although the fingerprint sensor 831 and the display panel 841 are illustrated as two separate components in FIG. 8 to realize the input and output functions of the mobile phone, in other examples, the fingerprint sensor 831 may be integrated with the display panel 841 to implement the input and output functions of the mobile phone.

The AP 880 is the control center of the mobile phone and configured to connect various parts of the whole mobile phone through various interfaces and lines, run or execute software programs and/or modules stored in the memory 820, and invoke data stored in the memory 820 to perform various functions of the mobile phone and process data, thereby monitoring the mobile phone as a whole. The AP 880 may include one or more processing units. For example, the AP 880 may integrate an application processor and a modem processor, where the application processor is configured to handle the operating system, the user interface, the application, and so on, and the modem processor is mainly configured to process wireless communication. It will be understood that the above-mentioned modem processor may not be integrated into the AP 880.

The memory 820 is configured to store an operating system and a lock-screen application. The operating system includes a FingerprintService and a power manager service (PMS). In addition, the memory 820 may include a high-speed RAM, and may further include a non-volatile memory such as at least one disk storage device, a flash memory device, or other non-volatile solid-state storage devices.

The RF circuit 810 is configured to transmit or receive information. Generally, the RF circuit 810 includes but is not limited to an antenna, at least one amplifier, a transceiver, a coupler, a low noise amplifier (LNA), a duplexer, and the like. In addition, the RF circuit 810 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The mobile phone may also include at least one sensor 850, such as a light sensor, a motion sensor, and other sensors. The light sensor may include an ambient light sensor and a proximity sensor, among which the ambient light sensor may adjust the brightness of the touch display screen according to ambient lights, and the proximity sensor may turn off the touch display screen and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify gestures of the mobile phone (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 860, a speaker 861, a microphone 862 may provide an audio interface between the user and the mobile phone. The audio circuit 860 may convert the received audio data into electrical signals and transfer the electrical signals to the speaker 861; thereafter the speaker 861 converts the electrical signals into sound signals for output. On the other hand, the microphone 862 converts the received sound signals into electrical signals, which will be received and converted into audio data by the audio circuit 860 for output. The audio data is then processed and transmitted by the AP 880 via the RF circuit 810 to another mobile phone for example, or the audio data is output to the memory 820 for further processing.

Wi-Fi belongs to a short-range wireless transmission technology. With aid of the Wi-Fi module 870, the mobile phone may assist the user in E-mail receiving and sending, webpage browsing, access to streaming media, and the like. Wi-Fi provides users with wireless broadband Internet access. Although the Wi-Fi module 870 is illustrated in FIG. 8, it can be understood that, the Wi-Fi module 870 is not essential to the mobile phone and can be omitted according to actual needs without departing from the essential nature of the present disclosure.

The mobile phone also includes a power supply 890 (e.g., a battery) that supplies power to various components. For instance, the power supply 890 may be logically connected to the AP 880 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 3 to FIG. 5 can be realized based on the structure of the mobile phone.

The functions of the units illustrated in FIG. 7 can be achieved based on the structure of the mobile phone.

Implementations of the present disclosure also provide a non-transitory computer readable storage medium. The non-transitory computer readable storage medium is configured to store a computer program which, when executed by a processor including an AP of a terminal, cause the processor to: instruct a fingerprint recognition device of the terminal to collect fingerprint data of a user upon detecting a first touch operation of the user in a first area of a touch display screen of the terminal, collect the fingerprint data and send the fingerprint data to a fingerprint recognition device MCU of the terminal, compare the fingerprint data with preset fingerprint template data in the terminal and instruct the AP to light up the touch display screen, with the fingerprint recognition device MCU, when the fingerprint data is matched with the fingerprint template data, and light up the touch display screen and unlock a lock-screen interface, with the AP.

Implementations of the present disclosure also provide a computer program product. The computer program product includes a non-transitory computer readable storage medium that stores computer programs. The computer programs are operable with a computer to execute part of or all the operations of any of the methods described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are example implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skilled in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A terminal, comprising an application processor (AP), a touch display screen, a fingerprint recognition device, an indicator, and a fingerprint recognition device microcontroller unit (MCU), the terminal having a fingerprint recognition area in a first area of the touch display screen, and the indicator being disposed below the first area; wherein
the touch display screen is configured to synchronously wake up the AP, the fingerprint recognition device, and the fingerprint recognition device MCU and to instruct the fingerprint recognition device MCU to light up the indicator, upon detecting a second touch operation of a user in a second area, wherein the second area is an area of the touch display screen other than the first area and has a larger size than the first area;
the fingerprint recognition device MCU is configured to light up the indicator;
the touch display screen is further configured to instruct the fingerprint recognition device to collect fingerprint data of the user upon detecting a first touch operation of the user in the first area lighted up by light from the indicator;
the fingerprint recognition device is configured to collect the fingerprint data and send the fingerprint data to the fingerprint recognition device MCU;
the fingerprint recognition device MCU is further configured to compare the fingerprint data with preset fingerprint template data in the terminal, and to instruct the AP to light up the touch display screen when the fingerprint data is matched with the fingerprint template data; and
the AP is configured to light up the touch display screen and to unlock the touch display screen.

2. The terminal of claim 1, wherein the second touch operation in the second area comprises one of:
a single-touch operation or a click-touch operation in the second area for consecutive N times within a preset duration, where N is an integer greater than 1,
a touching-and-sliding operation in the second area for a distance greater than a preset distance threshold, a touching-and-sliding operation in the second area in a graphic matched with a preset graphic, and
a pressing operation in the second area in a force greater than a preset strength threshold.

3. The terminal of claim 1, further comprising a memory, the memory being configured to store a lock-screen application and an operating system comprising a Fingerprint-Service and a power manager service (PMS), wherein the fingerprint recognition device MCU configured to compare the fingerprint data with the preset fingerprint template data in the terminal is configured to:
    invoke the FingerprintService to compare the fingerprint data with the preset fingerprint template data in the terminal; and
the AP configured to light up the touch display screen and unlock the touch display screen is configured to:
    invoke the PMS to light up the touch display screen and invoke the lock-screen application to unlock the touch display screen when the fingerprint data is matched with the fingerprint template data.

4. The terminal of claim 3, wherein the AP is further configured to wake up the PMS before lighting up an indicator.

5. The terminal of claim 1, wherein the first touch operation in the first area is an operation of touching the first area for a duration greater than a preset duration threshold.

6. The terminal of claim 1, wherein the terminal is in a screen-off state and the touch display screen is in a waked state.

7. A method for controlling unlocking of a terminal, comprising:
    synchronously waking up, with a touch display screen of the terminal, all an application processor (AP), a fingerprint recognition device, and a fingerprint recognition device microcontroller unit (MCU) of the terminal and instructing, with the touch display screen, the fingerprint recognition device MCU to light up an indicator disposed below a first area of the touch display screen, upon detecting a second touch operation of a user in a second area of the touch display screen, wherein the second area is an area of the touch display screen other than the first area and has a larger size than the first area;
    lighting up, with the fingerprint recognition device MCU, the indicator;
    instructing, with the touch display screen, the fingerprint recognition device to collect fingerprint data of the user upon detecting a first touch operation of the user in the first area lighted up by light from the indicator;
    collecting, with the fingerprint recognition device, the fingerprint data and sending, with the fingerprint recognition device, the fingerprint data to the fingerprint recognition device MCU;
    comparing, with the fingerprint recognition device MCU, the fingerprint data with preset fingerprint template data in the terminal, and instructing, with the fingerprint recognition device MCU, the AP to light up the touch display screen when the fingerprint data is matched with the fingerprint template data; and
    lighting up, with the AP, the touch display screen and unlocking, with the AP, the touch display screen.

8. The method of claim 7, wherein the second touch operation in the second area comprises one of:
    a single-touch operation or a click-touch operation in the second area for consecutive N times within a preset duration, where N is an integer greater than 1,
    a touching-and-sliding operation in the second area for a distance greater than a preset distance threshold, a touching-and-sliding operation in the second area in a graphic matched with a preset graphic, and
    a pressing operation in the second area in a force greater than a preset strength threshold.

9. The method of claim 7, wherein the terminal further comprises a memory, and the memory is configured to store a lock-screen application and an operating system comprising a FingerprintService and a power manager service (PMS), and wherein
    comparing, with the fingerprint recognition device MCU, the fingerprint data with the preset fingerprint template data in the terminal comprises:
        invoking, with the fingerprint recognition device MCU, the FingerprintService to compare the fingerprint data with the preset fingerprint template data in the terminal; and
    lighting up, with the AP, the touch display screen and unlocking, with the AP, the touch display screen comprises:
        invoking, with the AP, the PMS to light up the touch display screen and the lock-screen application to unlock the touch display screen when the fingerprint data is matched with the fingerprint template data.

10. The method of claim 9, wherein the method further comprises:
    before lighting up an indicator with the AP, waking up, with the AP, the PMS.

11. The method of claim 7, wherein the first touch operation in the first area is an operation of touching the first area for a duration greater than a preset duration threshold.

12. The method of claim 7, wherein the terminal is in a screen-off state and the touch display screen is in a waked state.

13. A non-transitory computer readable storage medium, storing a computer program which, when executed by a processor of a terminal, causes the processor to carry out actions, comprising:
    synchronously waking up all an application processor (AP), a fingerprint recognition device, and a fingerprint recognition device microcontroller unit (MCU) of the terminal and instructing the fingerprint recognition device MCU to light up an indicator disposed below a first area of a touch display screen of the terminal, upon detecting a second touch operation of a user in a second area of a touch display screen of the terminal, wherein the second area is an area of the touch display screen other than the first area of the touch display screen and has a larger size than the first area;
    lighting up, with the fingerprint recognition device MCU, the indicator;
    instructing the fingerprint recognition device of the terminal to collect fingerprint data of the user upon detecting a first touch operation of the user in the first area lighted up by light from the indicator of a touch display screen of the terminal;
    collecting the fingerprint data and sending the fingerprint data to the fingerprint recognition device MCU of the terminal;
    comparing the fingerprint data with preset fingerprint template data in the terminal, and instructing the AP to light up the touch display screen, with the fingerprint recognition device MCU, when the fingerprint data is matched with the fingerprint template data; and
    lighting up the touch display screen and unlocking a lock-screen interface, with the AP.

14. The non-transitory computer readable storage medium of claim 13, wherein the second touch operation in the second area comprises one of:
    a single-touch operation or a click-touch operation in the second area for consecutive N times within a preset duration, where N is an integer greater than 1,
    a touching-and-sliding operation in the second area for a distance greater than a preset distance threshold, a touching-and-sliding operation in the second area in a graphic matched with a preset graphic, and a pressing operation in the second area in a force greater than a preset strength threshold.

15. The non-transitory computer readable storage medium of claim 13, wherein the terminal further comprises a memory, and the memory is configured to store a lock-screen application and an operating system comprising a FingerprintService and a power manager service (PMS), and wherein:

the computer program executed by the processor to carry out the action of comparing, with the fingerprint recognition device MCU, the fingerprint data with the preset fingerprint template data in the terminal is executed by the processor to carry out actions, comprising:

invoking, with the fingerprint recognition device MCU, the FingerprintService to compare the fingerprint data with the preset fingerprint template data in the terminal; and the computer program executed by the processor to carry out the action of lighting up the touch display screen and unlocking the lock-screen interface, with the AP, is executed by the processor to carry out actions, comprising:

invoking, with the AP, the PMS to light up the touch display screen and the lock-screen application to unlock the lock-screen interface when the fingerprint data is matched with the fingerprint template data.

16. The non-transitory computer readable storage medium of claim 15, wherein the computer program, when executed by the processor, further causes the processor to carry out actions, comprising the following before lighting up an indicator:

waking up, with the AP, the PMS.

17. The non-transitory computer readable storage medium of claim 13, wherein the first touch operation in the first area is an operation of touching the first area for a duration greater than a preset duration threshold.

* * * * *